March 26, 1940.  R. E. BECHTOLD  2,194,843
LIQUID DISPENSING APPARATUS
Filed Feb. 25, 1938  5 Sheets-Sheet 1

INVENTOR.
Reuben E. Bechtold
BY
H. G. Burns ATTORNEY.

March 26, 1940.  R. E. BECHTOLD  2,194,843

LIQUID DISPENSING APPARATUS

Filed Feb. 25, 1938  5 Sheets-Sheet 3

Reuben E. Bechtold, INVENTOR.
BY
W. G. Burns ATTORNEY.

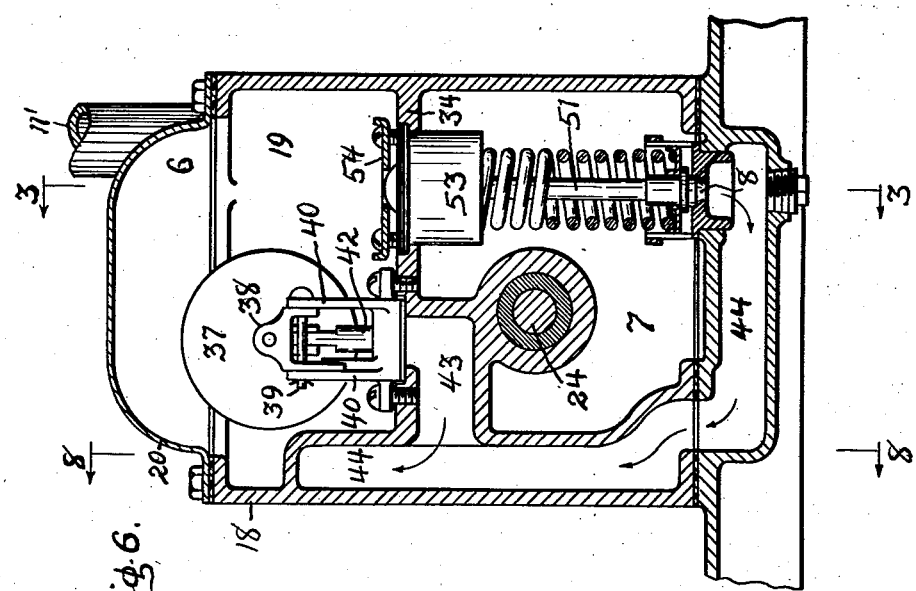
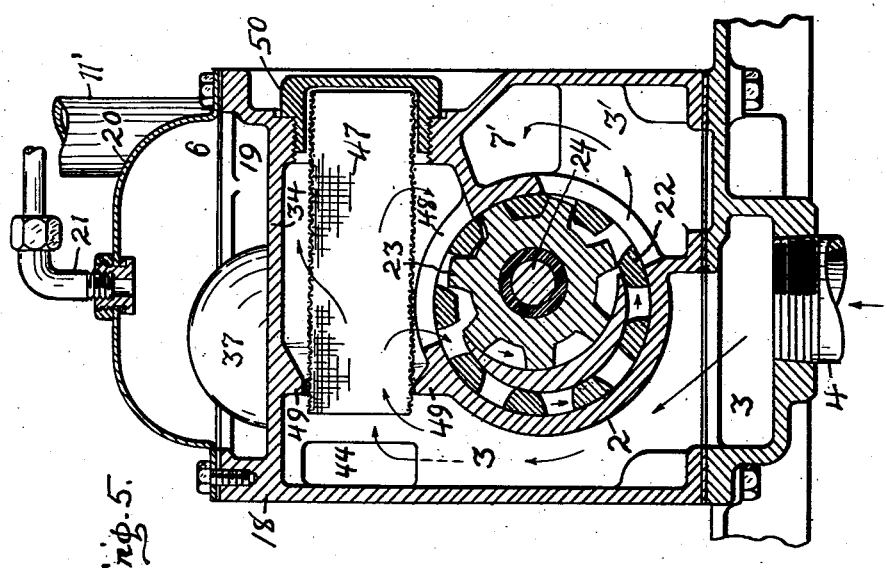

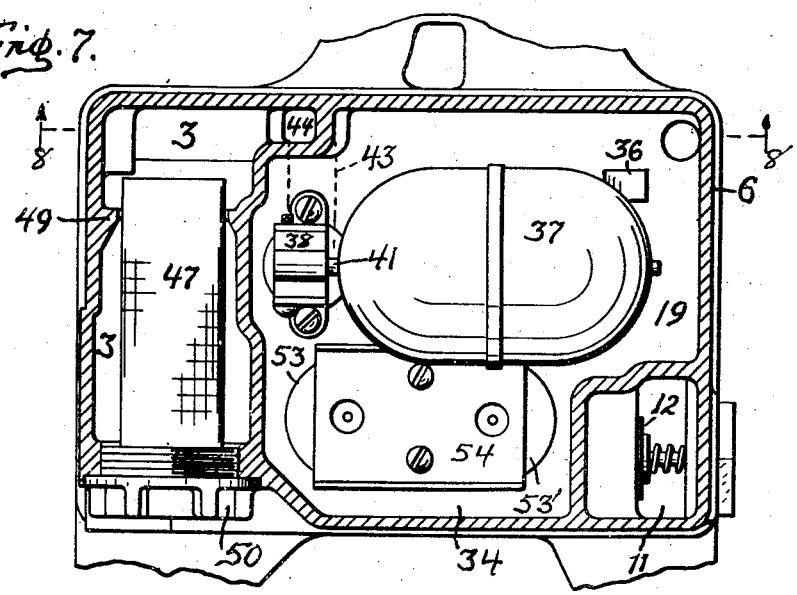
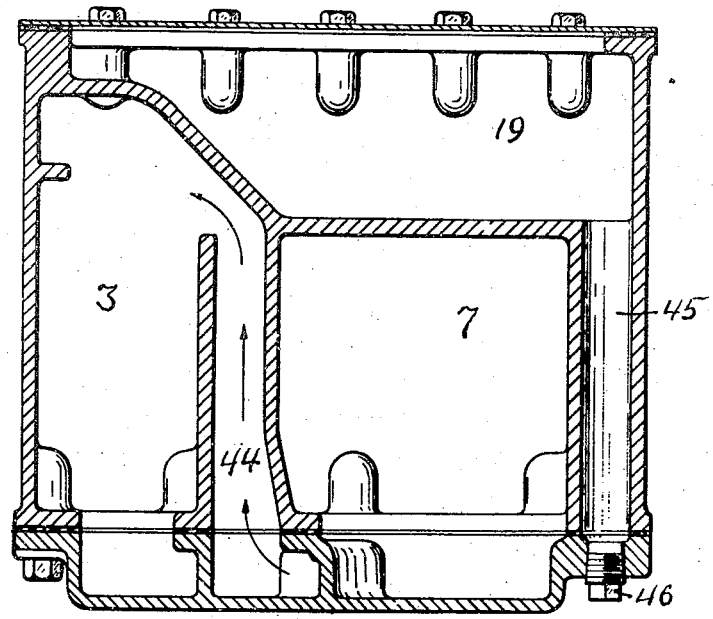

Patented Mar. 26, 1940

2,194,843

UNITED STATES PATENT OFFICE 2,194,843

LIQUID DISPENSING APPARATUS

Reuben E. Bechtold, Fort Wayne, Ind., assignor to Tokheim Oil Tank and Pump Company, Fort Wayne, Ind., a corporation of Indiana Application February 25, 1938, Serial No. 192,460

6 Claims. (Cl. 221—95)

This invention relates to liquid dispensing apparatus of the type ordinarily used at filling stations for supplying liquid fuel to automobiles.

An object of the invention is to provide, in a dispensing apparatus having a motor-driven pump for withdrawing liquid fuel from a supply tank and causing the liquid to flow through a dispensing pipe line in which is connected a meter associated with a counter or computer for indicating the quantity of liquid passing through the line which ordinarily terminates with a manually operated valve-controlled dispensing nozzle, means for stabilizing the pressure of liquid in said pipe line in order to obviate irregularity of the operation of said computer, counter or other indicating device.

It is also an object of the instant invention to insure precision in the operation of the meter, indicator or computer of liquid dispensers having such apparatuses.

Other objects and advantages of the invention appear in the following description.

An illustrative embodiment of the invention is shown in the accompanying drawings, in which:

Fig. 5 is a vertical sectional view of the pump mechanism and parts related therewith, the section being on the line 5—5 of Fig. 2;

Fig. 6 is another sectional view projected from Fig. 5, including the by-pass valve, the section being on the line 6—6 of Fig. 2;

Fig. 7 is a transverse sectional view, the section being through the float chamber; and Fig. 8 is a vertical sectional view showing the by-pass return duct, the section being on lines 8—8 of Figs. 6 and 7.

Figure 1:
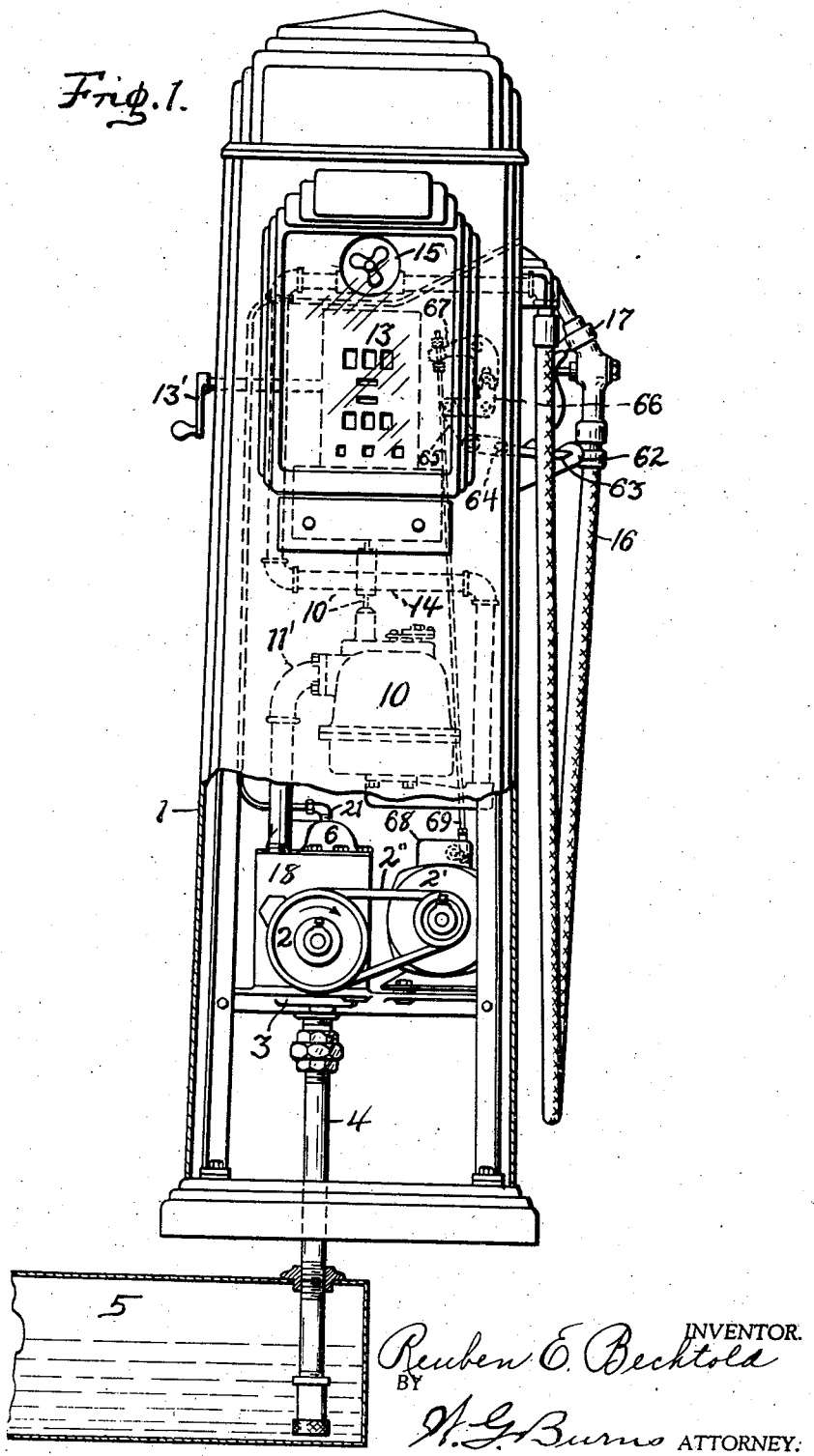
Fig. 1 is a front elevational view of a liquid fuel dispenser, a portion thereof being broken away, other parts being in section.
Figure 2:
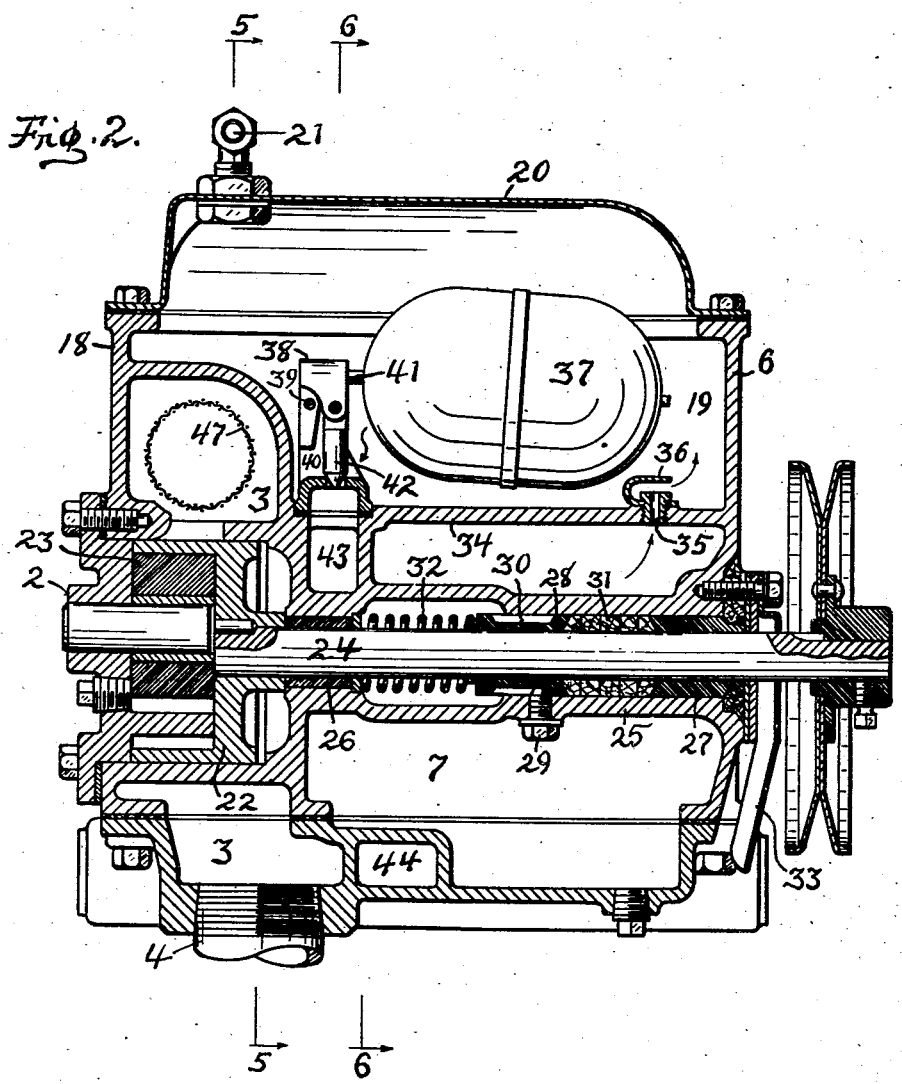
Fig. 2 is a sectional view showing the receiving chamber, pump and float chambers that form parts of the invention.

The instant invention is in some particulars similar to that disclosed in Letters Patent No. 1,868,444, issued to me July 19, 1932, for Air eliminator for liquid, and also in other particulars to the invention disclosed in my co-pending application, Ser. No. 162,584, filed September 7, 1937.

This invention is constituted of a group of connected operating units conveniently associated with a housing 1. In the group are included a pump 2 provided with a motor 2' for driving it through the medium of a belt 2" and having also a suction inlet 3 connected by a pipe 4 with a liquid fuel storage tank 5; an air eliminating unit 6 provided with a receiving chamber 7 connected with the outlet chamber 3' of said pump through a duct 7'; a valve mechanism constituted of a by-pass valve 8 and a regulating valve 9 located in said receiving chamber to control corresponding outlets; a meter 10 connected with the liquid outlet duct 11 for said receiving chamber by a pipe 11'; an outflow check valve 12 located in said liquid outlet duct for the receiving chamber; a counter or computer unit 13 having a reset crank 13' and provided with an operating stem 10' connected with and actuated by the meter; and a dispensing line 14 leading from the meter in which is connected a sight gauge 15 and which terminates with a flexible hose 16 provided with a manually operated valve-controlled nozzle 17.

*The pump and air eliminating units*

Preferably, the pump and air eliminating units are contained compactly within a common housing 18 in which is provided a receiving chamber 7 and also a float valve chamber 19, closed by a cover 20, provided with a vent outlet 21 at its top. The pump here shown is of a well known type similar in character to that set forth in my previous patent above identified, and is provided with rotors 22 and 23 that have geared relation with each other, the rotor 22 being keyed on a drive shaft 24 which extends through a tubular portion 25 that preferably is integral with the housing 18 and extends through the receiving chamber 7. Upon rotation of the drive shaft the rotors are actuated which causes functioning of the pump.

Within the tube 25, at the respective ends thereof, are provided bearings 26 and 27, and there is provided on the drive shaft a loose externally grooved sleeve 28 that has axial movement on said shaft limited by a screw 29 in the tube that projects into the groove 30 in said sleeve. A packing 31 is interposed between one end of the sleeve and the bearing 27, and there is also disposed around the shaft a compression spring 32 between the other end of the sleeve 28 and the bearing 26. By this means constant pressure of the sleeve is maintained against the packing so that leakage out between the drive shaft and the bearing 27 is forestalled. There is also provided upon the exterior of the housing an apron 33 by which is diverted downwardly and thereby disposed of any seepage that may escape to the exterior of the housing through said bearing.

In a partition 34 within the housing 18 that separates the receiving chamber 7 and the float chamber 19, there is provided a constantly open restricted passageway 35 through which is permitted to continuously pass a small amount of fluid from the receiving chamber including liquid and entrained effervescence constituted of gas and air that arises from agitation of the liquid as it passes through the appliance.

Over the passageway 35 is disposed, at a point suitably spaced therefrom, a deflector 36 to cause lateral deflection of fluid as it passes from the receiving chamber into the float chamber, thus to avoid influencing, by current, movement of a float 37, hereinafter referred to, located in said float chamber.

A tilting member 38 is mounted upon a pivot 39 supported in a bracket 40, and is connected with said float 37 by a stem 41. The tilting member has pivotally attached thereto a drain valve 42 that controls passage of liquid from the float chamber 19 into the suction chamber 3 of the pump through a branch duct 43 that has communication with an interconnecting duct 44 which is operatively associated with the by-pass valve 8 and the suction chamber 3 of the pump.

The housing 18 (Figs. 7-8) has therein a channel 45 leading downwardly from the float chamber 19 and is provided with a plug 46 at its lower end, the purpose of said channel being to permit draining of the float chamber if desired. Also, there is provided in the upper end of the suction chamber 3 of the pump a screen 47 removably positioned therein. The screen is confined in place above the suction inlet 48 of the pump at its inner end by a flange 49 provided within the housing and at its opposite end by a cap 50 threaded in the outer wall of the housing whereby is permitted convenient removal and replacement of said screen.

*Valve mechanism*

Within the receiving chamber is disposed the spring-restrained by-pass valve 8 provided at the upper end of its stem 51 with a piston head 52 that has reciprocal movement in a cylinder 53 secured in the partition 34 in the housing by means of a clamp plate 54. The head of the cylinder 53 has made therein an opening 55 for the free passage of fluid thereby to permit movement of the piston head. A spring 56 is disposed between the lower end of the cylinder structure 53 and the valve 8 for holding said valve normally in closed position. When pressure of the liquid within the receiving chamber 7 is raised to a predetermined point, the valve 8 automatically is raised by consequent action of the piston head connected therewith thus permitting the liquid in the receiving chamber to pass back through the interconnecting duct 44 into the suction inlet 3 of the pump and thereby preventing the pump and its driving motor from becoming stalled.

*Regulating valve*

Within the receiving chamber 7 also is disposed the regulating valve 9 by which is controlled flow of liquid from the receiving chamber into the liquid outlet duct 11. The valve 9 has a stem 57 provided at its top with a piston head, like that on the stem 51 of the by-pass valve, and has reciprocal movement in a corresponding vented cylinder 53'. A spring 58 is disposed between the cylinder 53' and the valve 9 that tends to hold said valve in closed position. The spring 58 for the regulating valve is so constituted as to have less resistance than the spring 56 for the by-pass valve, whereby the regulating valve, due to pressure within the receiving chamber, opens more readily than does the by-pass valve.

The regulating valve and the by-pass valve herein disclosed function in similar manner to the corresponding valves set forth in my previous Patent No. 1,868,444. In the present invention, however, there is disposed in the liquid outlet duct 11, which is controlled by the regulating valve 9, the spring-restrained outflow check valve 12.

Preferably, the outflow check valve 12 is movably disposed upon a stationary peg 59 that is mounted in a removable plug 60 which is screwed into the housing 18, and there is provided a compression spring 61 that bears against the valve 12 which tends to hold said valve in closed position. The valve has axial movement upon the peg, fits snugly thereon, but is sufficiently loose as to permit relief of fluid pressure that might occur within the dispensing line 14 due to rise of temperature or manipulation of the flexible hose 16. The backward urge of liquid in the duct 11 is readily relieved by passage thereof into the receiving chamber 7 past the regulating valve 9 which rises when excessive pressure occurs in said duct.

A stationary hose nozzle parking hook 62 is provided on the housing for support of the nozzle 17 when not in use, and a lever 63 is pivoted as indicated at 64 in the housing that has a link connection 65 with a pivoted bell crank 66 which is operatively associated with a second pivoted bell crank 67. Said second bell crank is connected operatively with the electric switch 68 on the motor 2' by means of a connecting rod 69. When the nozzle is positioned on its parking hook and bears upon the outer end of the lever 63, the electric switch thereby is held open and consequently the motor-driven pump is inactive. Upon removal of the nozzle from its parking bracket, as when dispensing gasoline from the apparatus, the switch may then be closed and the motor started by manually raising the outer end of the lever 63 thereby causing operation of the bell cranks 66—67 and the rod 69, thereby closing the switch 68 and consequent operation of the pump.

*Operation*

In utilizing the apparatus, the storage tank 5 is filled with liquid to be dispensed and the motor switch 68 is connected in the usual manner by means of conductors with a suitable source of electric energy (not shown). The apparatus is then primed as in the customary practice after which it is in readiness for dispensing operations. Upon removal of the nozzle from its parking hook the outer end of the lever 63 may then be manually raised to cause closing of the motor switch 68 through the medium of the intervening connections therefor provided. The nozzle tip then is inserted in the fill opening of the patron's vessel (not shown) and upon opening of the nozzle valve the liquid from the storage tank is drawn therefrom as the pump is actuated and forced into the receiving chamber of the air eliminating unit, and from thence through the meter 10, the dispensing line 14, sight gauge 15, flexible hose 16 and nozzle 17 into the patron's vessel.

Due to operation of the meter, caused by flow of liquid therethrough, the counter or computer is advanced to an extent corresponding with the quantity of outflow of liquid through the meter. Thus is indicated to the patron the quantity of liquid delivered. Upon closing of the dispensing nozzle the outflow of liquid is stopped. The nozzle is then returned to its idle position on its parking hook, thereby moving the lever 63 downwardly which causes opening of the motor switch and consequent inaction of the pump.

Figure 3:
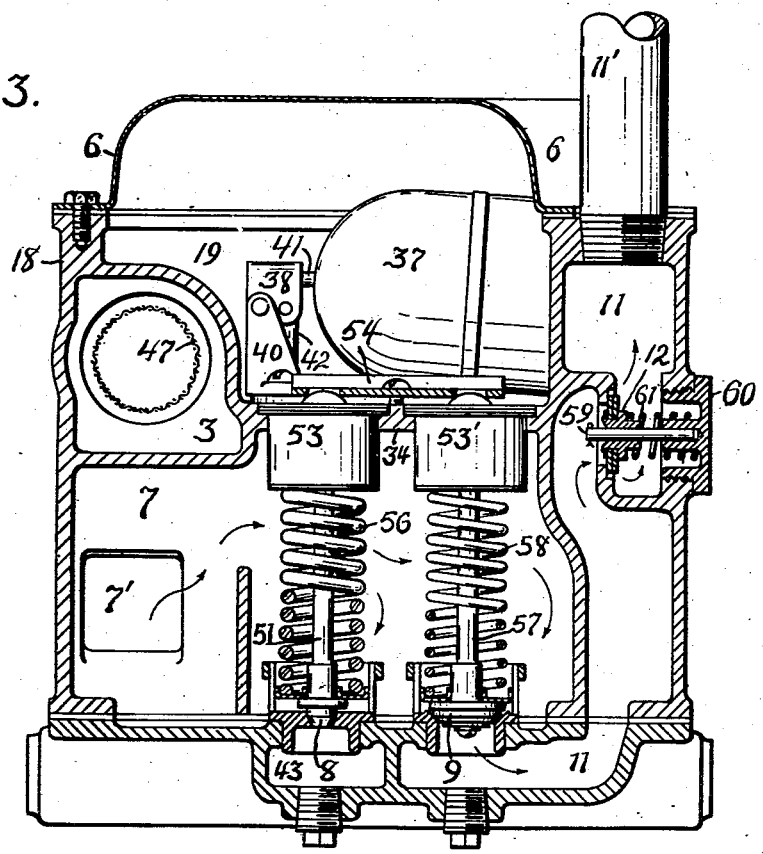
Fig. 3 is a vertical section of the receiving and float chambers, the view showing also the by-pass valve, regulating valve and check valve used in the apparatus.
Figure 4:
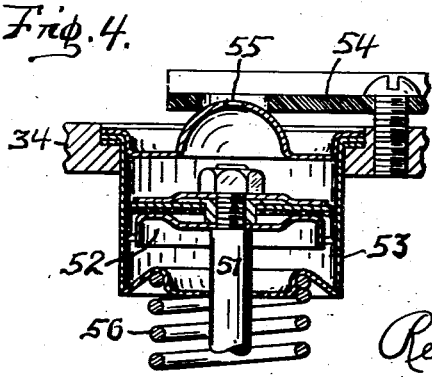
Fig. 4 is a detail view showing a vertical section of the piston and its cylinder for operating the by-pass valve, the structure being similar to that used in connection with the regulating valve.

During the passage of the liquid from the storage tank through the apparatus, the liquid first is drawn by action of the pump into the suction chamber 3 thereof and from thence through the screen 47 and intake port 48 of the pump. The liquid then passes through the pump and is discharged from its outlet chamber 3' into the receiving chamber 7 through a duct 7' therefor provided. (Figs. 3 and 5.)

During operation of the pump, a limited amount of liquid that enters the receiving chamber passes therefrom through the constantly open restricted passageway 35 into the float chamber 19, whereby is removed from the receiving chamber effervescence, such as gas and air that is entrained with escaping liquid. Thus the receiving chamber is continuously relieved of gas and air. From the float chamber the gas and air constituents therein escape to the atmosphere through the vent outlet 21, while the liquid constituent, when accumulation thereof is of such quantity as to raise the float 37, the drain valve 42 is thereby opened and the accumulated liquid within the float chamber is thereupon drawn by suction of the pump into its suction chamber 3 through the branch duct 43 and interconnecting duct 44 and subsequently re-enters the receiving chamber 7 by action of the pump.

While the pump is in operation, pressure of liquid in the receiving chamber 7 is raised, and when the pressure reaches a predetermined point, the regulating valve 9 is raised by upward movement of the piston head on its stem in opposition to restraint of its spring 58, thus permitting liquid from the receiving chamber to pass into the liquid outlet duct 11. When the liquid pressure in the receiving chamber rises to a second higher predetermined point, as occurs when the pump is operated and the dispensing nozzle valve is closed, the by-pass valve 8 thereupon is raised by action of its piston head 52 in opposition to restraint of its spring 56, thus permitting the liquid supplied by the pump, through its outlet chamber into the receiving chamber 7, to pass back into the suction chamber 3 of the pump, whereby to circumvent stalling of the pump.

An important feature of the invention is the supplemental outflow check valve 12, preferably located in the outlet duct 11 that co-operates with the regulating valve 9 in permitting outflow of liquid through the dispensing line and in preventing backflow of liquid through the meter into the receiving chamber 7, except such amount as is forced backwardly between the hub of the valve 12 and its supporting peg 59 after stopping of the pump and pressure in the dispensing line becomes excessive incidental to rise in temperature, or bending or coiling of the hose. In this manner the dispensing flow line and the meter are at all times kept completely filled with liquid under pressure, and backflow of the liquid therefrom, except when the liquid pressure becomes excessive, is prevented. When operation of the pump is resumed, while the nozzle is still closed, the normal operating liquid pressure is maintained in the flow line and therefore the meter is not materially affected.

Upon stopping of the pump the pressure in the receiving chamber 7 is relieved by escape of fluid through the passageway 35, whereupon, the regulating valve 9 automatically closes. The function of the outflow check valve 12 is to substantially retain the operating pressure in the dispensing line and meter until after the regulating valve is completely closed. This operation occurs upon closing of the nozzle and subsequent stopping operation of the pump. When the outflow check valve 12 closes, the dispensing line is substantially maintained full of liquid under operating pressure, and especially during closing movement of the regulating valve 9 which follows as the pump coasts to a complete stop. Should excessive pressure occur in the dispensing line, due to rise of temperature or flexure of the hose, such excessive pressure is relieved by leakage past the outflow check valve and back pressure against the regulating valve, whereupon the excess of liquid in the dispensing line is admitted back into the receiving chamber. By this arrangement also is obviated, when the pump is again started, sudden rush of liquid through the meter that ordinarily might cause an unintended progression or disturbance of the meter and consequent inaccurate indication by the counter or computer.

What I claim is:

1. In a liquid dispenser of the type provided with an air eliminating unit, liquid supply means connected therewith, a dispensing line having a meter connected therein and terminating with a manually operated valve-controlled nozzle, and a spring restrained regulating valve provided with means in connection therewith for opening said valve by pressure of liquid within the receiving chamber of said unit and being adapted to permit backflow of liquid from the dispensing line into said chamber when the pressure in said line materially exceeds that in said chamber, a spring restrained outflow check valve disposed in the dispensing line between said regulating valve and the meter adapted to permit limited backflow of liquid within the dispensing line into said receiving chamber.

2. In a liquid dispenser of the type provided with an air eliminating unit, liquid supply means connected therewith, a dispensing line terminating with a manually operated valve-controlled nozzle, and a spring restrained regulating valve provided with means in connection therewith for opening said valve by pressure of liquid within the receiving chamber of said unit and being adapted to permit backflow of liquid from the dispensing line into said chamber when the pressure in said line materially exceeds that in said chamber, a spring restrained outflow check valve disposed in the dispensing line between said regulating valve and the nozzle adapted to permit limited backflow of liquid within the dispensing line into said receiving chamber.

3. In a liquid dispenser of the type provided with an air eliminating unit, a dispensing line connected therewith that terminates with a manually operated valve-controlled nozzle, and a regulating valve operable to open by pressure within the receiving chamber of said unit to permit outflow therefrom into said line and also operable to permit backflow from said line into said chamber when the pressure in said line exceeds that in said chamber, an outflow check valve in said line adapted to permit limited backflow from said line into said receiving chamber.

4. In a liquid dispenser of the type provided with an air eliminating unit and a dispensing line connected therewith that terminates with a manually operated valve-controlled nozzle, a regulating valve operable to open by pressure within the receiving chamber of said unit to permit outflow therefrom into said line, and also operable to permit backflow from said line into said chamber when the pressure in said line exceeds that in said chamber, a check valve in said line operable to permit outflow of liquid through said line and adapted also to permit limited backflow therein to said receiving chamber.

5. In a liquid dispenser of the type having a dispensing line, terminating with a manually operated valve controlled nozzle and provided with a regulating valve controlling the flow of liquid into said line, a check valve in said line operable to permit outflow of liquid through said line and adapted also to permit limited backflow of liquid therein.

6. In a liquid dispenser of the type in which is included a dispensing line connected with a source of supply of liquid and terminating with a manually operated valve-controlled nozzle, a check valve in said line operable to permit outflow of liquid through said line and adapted also to permit a limited amount of backflow therein.

REUBEN E. BECHTOLD.